(12) United States Patent
Supahan et al.

(10) Patent No.: US 8,529,679 B2
(45) Date of Patent: Sep. 10, 2013

(54) SYSTEM AND METHOD FOR IMPROVING PERFORMANCE OF AN IGCC POWER PLANT

(75) Inventors: Asiff Apdul Supahan, Bangalore (IN); Viswanath Balasubramaniyan, Bangalore (IN); Saumar Jyoti Hazarika, Bangalore (IN)

(73) Assignee: General Electric Company, Schenectady, NY (US)

( * ) Notice: Subject to any disclaimer, the term of this patent is extended or adjusted under 35 U.S.C. 154(b) by 918 days.

(21) Appl. No.: 12/613,308

(22) Filed: Nov. 5, 2009

(65) Prior Publication Data
US 2011/0099971 A1    May 5, 2011

(51) Int. Cl.
*B01D 47/00* (2006.01)

(52) U.S. Cl.
USPC .................................. 96/243; 96/244; 502/55

(58) Field of Classification Search
USPC ..................... 96/243, 244; 95/149, 187, 193, 95/194, 209, 227, 235; 502/55
See application file for complete search history.

(56) References Cited

U.S. PATENT DOCUMENTS

| | | | |
|---|---|---|---|
| 2,795,115 A * | 6/1957 | Kumm | 62/148 |
| 3,690,816 A * | 9/1972 | Ailleman | 423/228 |
| 4,653,268 A | 3/1987 | Nakamura et al. | |
| 5,406,786 A | 4/1995 | Scharpf et al. | |
| 5,685,138 A | 11/1997 | Rao et al. | |
| 6,058,695 A | 5/2000 | Ranasinghe et al. | |

FOREIGN PATENT DOCUMENTS

| | | |
|---|---|---|
| EP | 0634562 A2 | 1/1995 |
| EP | 707880 A1 | 4/1996 |
| WO | 97/39235 A1 | 10/1997 |
| WO | 2007/017387 A2 | 2/2007 |
| WO | 2008/014481 A1 | 1/2008 |

* cited by examiner

*Primary Examiner* — Robert A Hopkins
(74) *Attorney, Agent, or Firm* — Fletcher Yoder, P.C.

(57) ABSTRACT

In certain embodiments, a system includes a gas cleaner. The gas cleaner includes a solvent to clean a syngas. The system also includes a heat exchanger configured to heat a liquid to generate a vapor. The system further includes a vapor absorption refrigeration (VAR) cycle coupled to the gas cleaner and the heat exchanger. The VAR cycle is configured to cool the solvent. In addition, the vapor drives the VAR cycle.

10 Claims, 5 Drawing Sheets

US 8,529,679 B2

SYSTEM AND METHOD FOR IMPROVING PERFORMANCE OF AN IGCC POWER PLANT

BACKGROUND OF THE INVENTION

The subject matter disclosed herein relates to integrated gasification combined cycle (IGCC) power plants. More specifically, the disclosed embodiments relate to systems and methods for improving the performance of IGCC power plants.

IGCC power plants are capable of generating energy from various carbonaceous feedstock, such as coal or natural gas, relatively cleanly and efficiently. IGCC technology may convert the carbonaceous feedstock into a gas mixture of carbon monoxide (CO) and hydrogen (H2), i.e., syngas, by reaction with oxygen and steam in a gasifier. These gases may be cleaned, processed, and utilized as fuel in the IGCC power plant. For example, the syngas may be fed into a combustor of a gas turbine of the IGCC power plant and ignited to power the gas turbine for use in the generation of electricity. Such IGCC power plants include several components that generate low-grade heat, which is subsequently dissipated.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a gas cleaner. The gas cleaner includes a solvent to clean a syngas. The system also includes a heat exchanger configured to heat a liquid to generate a vapor. The system further includes a vapor absorption refrigeration (VAR) cycle coupled to the gas cleaner and the heat exchanger. The VAR cycle is configured to cool the solvent. In addition, the vapor drives the VAR cycle.

In a second embodiment, a system includes a multi-cooler controller. The multi-cooler controller includes a first cooler controller and a second cooler controller. The first cooler controller is configured to control a vapor compression refrigeration (VCR) cycle. The second cooler controller is configured to control a VAR cycle. The multi-cooler controller is configured to selectively adjust loads of the VCR cycle and the VAR cycle to cool a solvent of a gas cleaner.

In a third embodiment, a system includes an IGCC heat exchanger configured to heat water to produce steam. The IGCC heat exchanger includes a syngas cooler downstream from a gasifier or an air cooler coupled to an air separation unit (ASU). The system also includes a steam conduit coupled to the IGCC heat exchanger. The system further includes an IGCC component coupled to the steam conduit. The IGCC component includes a VAR cycle, a deaerator, or a steam turbine.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
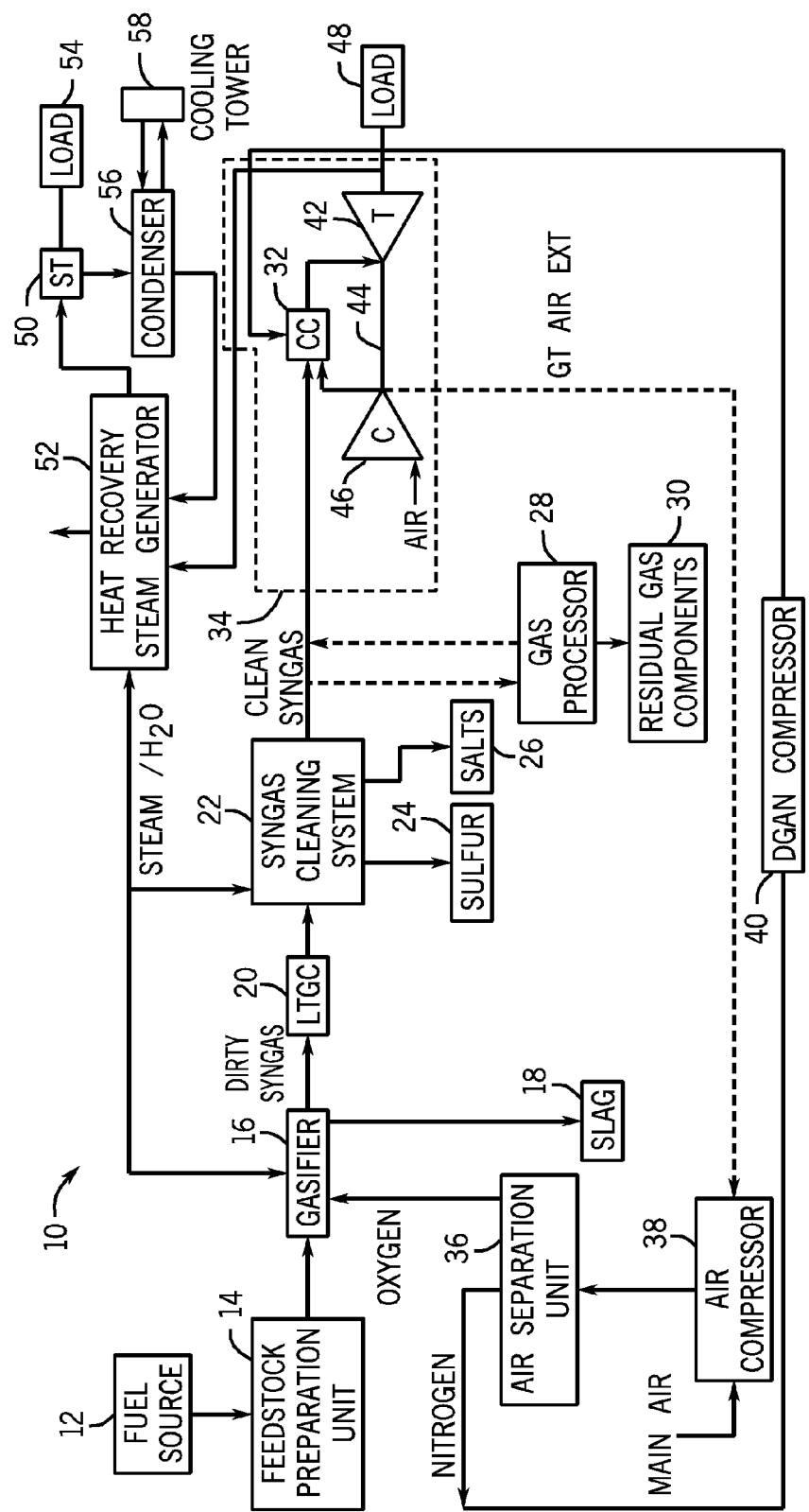
FIG. 1 a schematic block diagram of an exemplary embodiment of an IGCC power plant.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

IGCC plants with carbon capture consume more auxiliary loads compared to non-carbon capture plants. However, these same plants generate low-grade heat energy, which may otherwise be dissipated, for example, in cooling water systems. The disclosed embodiments reduce utility power consumption and cooling tower loads of an IGCC plant by utilizing low, low pressure (LLP) steam (e.g., steam at a pressure range between 20-40 psia) generated from this low-grade heat energy by various IGCC heat exchangers, such as air separation unit (ASU) compressor inter-coolers and after-coolers, low-temperature gas cooling (LTGC) section, trim coolers, and so forth. However, other IGCC heat exchangers may be used to generate the LLP steam.

In certain embodiments, the LLP steam may be used to reduce utility power consumption for an acid gas removal (AGR) solvent refrigeration system of the IGCC plant by using the LLP steam to drive a vapor absorption refrigeration cycle. In other embodiments, the LLP steam may be used to cool inlet air into a gas turbine engine of the IGCC plant by using the LLP steam to drive another vapor absorption refrigeration cycle. The efficiency of the gas turbine engine may generally depend upon the ambient air temperature. During hot days, the output of the gas turbine engine may be reduced due to the low density of the ambient air. Therefore, cooling the inlet air into the gas turbine engine improves the output and efficiency of the IGCC plant. In yet other embodiments, the LLP steam may be used to reduce the amount of low-pressure steam extracted from a steam turbine of the IGCC plant by supplementing the flow of extracted low-pressure steam in a deaeration system. In still other embodiments, the LLP steam may be admitted into a low-pressure section of a steam turbine of the IGCC plant to increase the output and efficiency of the steam turbine. However, the LLP steam may be used in various other applications throughout the IGCC plant.

FIG. 1 illustrates an IGCC system 10 that may be powered by synthetic gas, e.g., syngas. Elements of the IGCC system 10 may include a fuel source 12, such as a solid feed, which may be utilized as a source of energy for the IGCC. The fuel source 12 may include coal, petroleum coke, biomass, wood-based materials, agricultural wastes, tars, coke oven gas and asphalt, or other carbon containing items.

The solid fuel of the fuel source 12 may be passed to a feedstock preparation unit 14. The feedstock preparation unit 14 may, for example, resize or reshaped the fuel source 12 by chopping, milling, shredding, pulverizing, briquetting, or palletizing the fuel source 12 to generate feedstock. Additionally, water, or other suitable liquids, may be added to the fuel source 12 in the feedstock preparation unit 14 to create slurry feedstock. In other embodiments, no liquid is added to the fuel source 12, thus yielding dry feedstock.

The feedstock may be passed to a gasifier 16 from the feedstock preparation unit 14. The gasifier 16 may convert the feedstock into a combination of carbon monoxide and hydrogen, e.g., syngas. This conversion may be accomplished by subjecting the feedstock to a controlled amount of steam and oxygen at elevated pressures (e.g. from approximately 290 psia to 1230 psia) and temperatures (e.g., approximately 1300° F.-2900° F.), depending on the type of gasifier 16 utilized. The gasification process may include the feedstock undergoing a pyrolysis process, whereby the feedstock is heated. Temperatures inside the gasifier 16 may range from approximately 300° F. to 1300° F. during the pyrolysis process, depending on the fuel source 12 utilized to generate the feedstock. The heating of the feedstock during the pyrolysis process may generate a solid, e.g., char, and residue gases, e.g., carbon monoxide, and hydrogen.

A combustion process may then occur in the gasifier 16. The combustion may include introducing oxygen to the char and residue gases. The char and residue gases may react with the oxygen to form carbon dioxide and carbon monoxide, which provides heat for the subsequent gasification reactions. The temperatures during the combustion process may range from approximately 1300° F. to 2900° F. Next, steam may be introduced into the gasifier 16 during a gasification step. The char may react with the carbon dioxide and steam to produce carbon monoxide and hydrogen at temperatures ranging from approximately 1500° F. to 2000° F. In essence, the gasifier utilizes steam and oxygen to allow some of the feedstock to be "burned" to produce carbon monoxide and energy, which drives a second reaction that converts further feedstock to hydrogen and additional carbon dioxide. In this way, a resultant gas is manufactured by the gasifier 16. This resultant gas may include approximately 85% of carbon monoxide and hydrogen, as well as $CH_4$, CO2, H2O, HCl, HF, COS, $NH_3$, HCN, and $H_2S$ (based on the sulfur content of the feedstock). This resultant gas may be termed dirty syngas. The gasifier 16 may also generate waste, such as slag 18, which may be a wet ash material. This slag 18 may be removed from the gasifier 16 and disposed of, for example, as road base or as another building material.

The dirty syngas may then be directed into a low-temperature gas cooling (LTGC) unit 20, which may be configured to cool the dirty syngas. As described below, the LTGC unit 20 may include one or more heat exchangers configured to transfer heat from the heated dirty syngas into other media, such as steam condensate, cooling water from a cooling tower, and boiler feedwater from a boiler feedwater system.

The cooled dirty syngas from the LTGC unit 20 may then be cleaned in a syngas cleaning system 22. The syngas cleaning system 22 may scrub the cooled dirty syngas to remove the HCl, HF, COS, HCN, and $H_2S$ from the cooled dirty syngas, which may include separation of sulfur 24 by, for example, an acid gas removal (AGR) process. Furthermore, the syngas cleaning system 22 may separate salts 26 from the cooled dirty syngas via a water treatment process that may utilize water purification techniques to generate usable salts 26 from the cooled dirty syngas. Subsequently, the gas from the syngas cleaning system 22 may include clean syngas.

A gas processor 28 may be utilized to remove residual gas components 30 from the clean syngas such as, ammonia, methanol, or any residual chemicals. However, removal of residual gas components 30 from the clean syngas is optional, since the clean syngas may be utilized as a fuel even when containing the residual gas components 30, e.g., tail gas. This clean syngas may be transmitted to a combustor 32 (e.g., a combustion chamber) of a gas turbine engine 34 as combustible fuel.

The IGCC system 10 may further include an air separation unit (ASU) 36. The ASU 36 may operate to separate air into component gases by, for example, distillation techniques. The ASU 36 may separate oxygen from the air supplied to it from an ASU compressor 38, and the ASU 36 may transfer the separated oxygen to the gasifier 16. Additionally, the ASU 36 may transmit separated nitrogen to a diluent gaseous nitrogen (DGAN) compressor 40. As described below, the ASU compressor 38 may include one or more compression sections, one or more inter-coolers between the compression sections, and/or one or more after-coolers after the compression sections. The inter-coolers and after-coolers may cool the compressed air before delivering the compressed air to the ASU 36.

The DGAN compressor 40 may compress the nitrogen received from the ASU 36 at least to pressure levels equal to those in the combustor 32 of the gas turbine engine 34, for proper injection to happen into the combustor chamber. Thus, once the DGAN compressor 40 has adequately compressed the nitrogen to a proper level, the DGAN compressor 40 may transmit the compressed nitrogen to the combustor 32 of the gas turbine engine 34. The nitrogen may be used as a diluent to facilitate control of emissions, for example.

The gas turbine engine 34 may include a turbine 42, a drive shaft 44 and a compressor 46, as well as the combustor 32. The combustor 32 may receive fuel, such as syngas, which may be injected under pressure from fuel nozzles. This fuel may be mixed with compressed air as well as compressed nitrogen from the DGAN compressor 40, and combusted within combustor 32. This combustion may create hot pressurized combustion gases.

The combustor 32 may direct the combustion gases towards an inlet of the turbine 42. As the combustion gases from the combustor 32 pass through the turbine 42, the combustion gases may force turbine blades in the turbine 42 to rotate the drive shaft 44 along an axis of the gas turbine engine 34. As illustrated, drive shaft 44 is connected to various components of the gas turbine engine 34, including the compressor 46.

The drive shaft 44 may connect the turbine 42 to the compressor 46 to form a rotor. The compressor 46 may include blades coupled to the drive shaft 44. Thus, rotation of turbine blades in the turbine 42 causes the drive shaft 44 connecting the turbine 42 to the compressor 46 to rotate blades within the compressor 46. This rotation of blades in the compressor 46 may cause the compressor 46 to compress air received via an air intake in the compressor 46. The compressed air may then be fed to the combustor 32 and mixed with fuel and compressed nitrogen to allow for higher efficiency combustion. The drive shaft 44 may also be connected to a load 48, which may be a stationary load, such as an electrical generator for producing electrical power, for example, in a power plant. Indeed, the load 48 may be any suitable device that is powered by the rotational output of the gas turbine engine 34.

The IGCC system 10 also may include a steam turbine engine 50 and a heat recovery steam generation (HRSG) system 52. The steam turbine engine 50 may drive a second load 54. The second load 54 may also be an electrical generator for generating electrical power. However, both the first and second loads 48, 54 may be other types of loads capable of being driven by the gas turbine engine 34 and steam turbine engine 50, respectively. In addition, although the gas turbine engine 34 and steam turbine engine 50 may drive separate loads 48 and 54, as shown in the illustrated embodiment, the gas turbine engine 34 and steam turbine engine 50 may also be utilized in tandem to drive a single load via a single shaft. The specific configuration of the steam turbine engine 50, as well as the gas turbine engine 34, may be implementation-specific and may include any combination of sections.

The system 10 may also include the HRSG 52. Heated exhaust gas from the gas turbine engine 34 may be transported into the HRSG 52 and used to heat water and produce steam used to power the steam turbine engine 50. Exhaust from, for example, a low-pressure section of the steam turbine engine 50 may be directed into a condenser 56. The condenser 56 may utilize a cooling tower 58 to exchange heated water for cooled water. The cooling tower 58 acts to provide cool water to the condenser 56 to aid in condensing the steam transmitted to the condenser 56 from the steam turbine engine 50. Condensate from the condenser 56 may, in turn, be directed into the HRSG 52. Again, exhaust from the gas turbine engine 34 may also be directed into the HRSG 52 to heat the water from the condenser 56 and produce steam.

In combined cycle systems such as the IGCC system 10, hot exhaust may flow from the gas turbine engine 34 and pass to the HRSG 52, where it may be used to generate high-pressure, high-temperature steam. The steam produced by the HRSG 52 may then be passed through the steam turbine engine 50 for power generation. In addition, the produced steam may also be supplied to any other processes where steam may be used, such as to the gasifier 16. The gas turbine engine 34 generation cycle is often referred to as the "topping cycle," whereas the steam turbine engine 50 generation cycle is often referred to as the "bottoming cycle." By combining these two cycles as illustrated in FIG. 1, the IGCC system 10 may lead to greater efficiencies in both cycles. In particular, exhaust heat from the topping cycle may be captured and used to generate steam for use in the bottoming cycle.

As described above, the IGCC system 10 includes several components that generate low-grade heat energy, which may otherwise be dissipated. The disclosed embodiments utilize this low-grade heat energy to generate low, low pressure (LLP) steam for use in various methods to improve the overall performance of the IGCC system 10. The LLP steam may be in the range of approximately 20-40 psia, as opposed to low pressure (LP) applications, which are generally in the range of approximately 60-100 psia. Two particular components of the IGCC system 10 that generate this type of low-grade heat energy, which may be converted into LLP steam, are the LTGC unit 20 and the ASU compressor 38 of FIG. 1. However, the disclosed embodiments for utilizing LLP steam may be applied to the generation of low-grade heat energy by any other components of the IGCC system 10.

Figure 2:
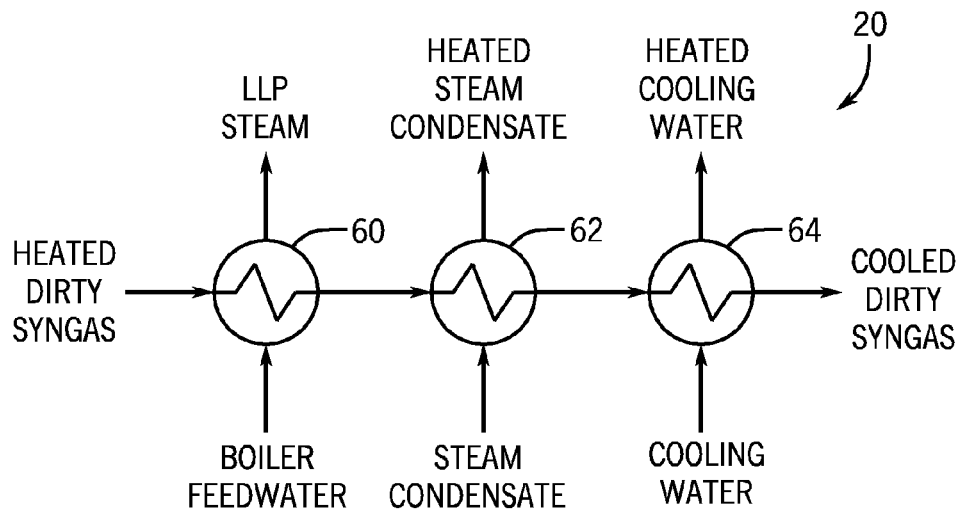
FIG. 2 is a process flow diagram of an exemplary embodiment of a low-temperature gas cooling (LTGC) unit of FIG. 1, which may generate low, low pressure (LLP) steam.
Figure 3:
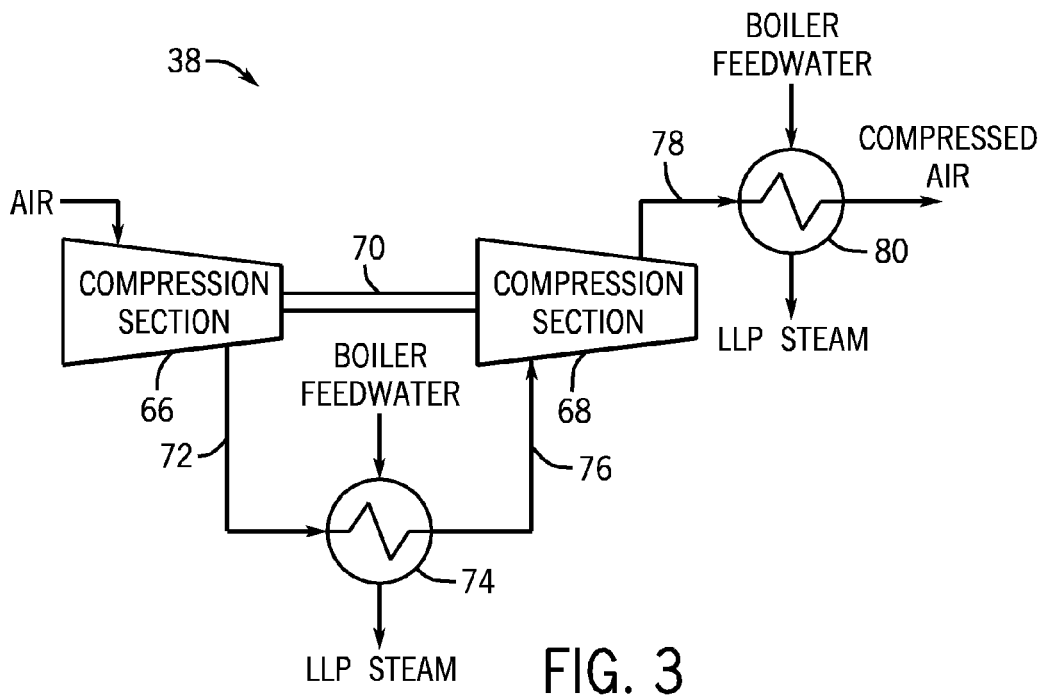
FIG. 3 is a process flow diagram of an exemplary embodiment of an ASU air compressor of FIG. 1, which may generate LLP steam.

FIGS. 2 and 3 illustrate two exemplary components of the IGCC system 10 that may be used to generate LLP steam for use in various applications throughout the IGCC system 10. For example, FIG. 2 is a process flow diagram of an exemplary embodiment of the LTGC unit 20 of FIG. 1. As illustrated, in certain embodiments, the LTGC unit 20 may include three heat exchangers 60, 62, 64. The three heat exchangers 60, 62, 64 may be any type of heat exchangers capable of transferring heat from syngas to a coolant, such as water or steam condensate. In particular, the LTGC unit 20 may include a first heat exchanger 60 (e.g., an LLP steam generator) configured to receive heated dirty syngas from the gasifier 16 of FIG. 1 and to cool the heated dirty syngas with boiler feedwater. More specifically, heat from the heated dirty syngas may be transferred into the boiler feedwater to generate LLP steam.

For example, in certain embodiments, the heated dirty syngas may enter the first heat exchanger 60 at a temperature of approximately 315° F. and the boiler feedwater may enter the first heat exchanger 60 at a temperature of approximately 95° F. However, in other embodiments, the heated dirty syngas may enter the first heat exchanger 60 at a temperature in the range of 250-400° F. More specifically, the heated dirty syngas may enter the first heat exchanger 60 at a temperature of approximately 290° F., 295° F., 300° F., 305° F., 310° F., 315° F., 320° F., 325° F., 330° F., 335° F., 340° F., and so forth. In addition, the boiler feedwater may enter the first heat exchanger 60 at a temperature in the range of 70-290° F. More specifically, the boiler feedwater may enter the first heat exchanger 60 at a temperature of approximately 80° F., 85° F., 90° F., 95° F., 100° F., 105° F., 110° F., and so forth.

In certain embodiments, the generated LLP steam may exit the first heat exchanger 60 at a temperature of approximately 250° F. and the dirty syngas may exit the first heat exchanger 60 at a temperature of approximately 255° F. However, in other embodiments, the generated LLP steam may exit the first heat exchanger 60 at a temperature in the range of 200-300° F. More specifically, the generated LLP steam may exit the first heat exchanger 60 at a temperature of approximately 225° F., 230° F., 235° F., 240° F., 245° F., 250° F., 255° F., 260° F., 265° F., 270° F., 275° F., and so forth. In addition, the dirty syngas may exit the first heat exchanger 60 at a temperature in the range of 200-300° F. More specifically, the dirty syngas may exit the first heat exchanger 60 at a temperature of approximately 230° F., 235° F., 240° F., 245° F., 250° F., 255° F., 260° F., 265° F., 270° F., 275° F., 280° F., and so forth. In addition, in certain embodiments, the generated LLP steam may exit the first heat exchanger 60 at approximately 30 psia or, in other embodiments, may exit the first heat exchanger 60 within the range of 20 psia to 40 psia. As described below, the generated LLP steam may be used in various applications throughout the IGCC system 10.

As illustrated in FIG. 2, the LTGC unit 20 may also include a second heat exchanger 62 configured to receive dirty syngas from the first heat exchanger 60 and to cool the dirty syngas with steam condensate. More specifically, heat from the dirty syngas may be transferred into the steam condensate to generate heated steam condensate.

For example, in certain embodiments, the dirty syngas may enter the second heat exchanger 62 at a temperature of approximately 255° F. and the steam condensate may enter the second heat exchanger 62 at a temperature of approximately 100° F. However, in other embodiments, the dirty syngas may enter the second heat exchanger 62 at a temperature in the range of 200-300° F. More specifically, the dirty syngas may enter the second heat exchanger 62 at a temperature of approximately 230° F., 235° F., 240° F., 245° F., 250° F., 255° F., 260° F., 265° F., 270° F., 275° F., 280° F., and so forth. In addition, the steam condensate may enter the second heat exchanger 62 at a temperature in the range of 50-150° F. More specifically, the steam condensate may enter the second heat exchanger 62 at a temperature of approximately 85° F., 90° F., 95° F., 100° F., 105° F., 110° F., 115° F., and so forth.

In certain embodiments, the heated steam condensate may exit the second heat exchanger 62 at a temperature of approximately 200° F. and the dirty syngas may exit the second heat exchanger 62 at a temperature of approximately 120° F. However, in other embodiments, the heated steam condensate may exit the second heat exchanger 62 at a temperature in the range of 150-250° F. More specifically, the heated steam condensate may exit the second heat exchanger 62 at a temperature of approximately 175° F., 180° F., 185° F., 190° F., 195° F., 200° F., 205° F., 210° F., 215° F., 220° F., 225° F., and so forth. In addition, the dirty syngas may exit the second heat exchanger 62 at a temperature in the range of 50-150° F. More specifically, the dirty syngas may exit the second heat exchanger 62 at a temperature of approximately 105° F., 110° F., 115° F., 120° F., 125° F., 130° F., 135° F., and so forth.

As illustrated in FIG. 2, the LTGC unit 20 may also include a third heat exchanger 64 configured to receive dirty syngas from the second heat exchanger 62 and to cool the dirty syngas with cooling water from the cooling tower 58 of FIG. 1. More specifically, heat from the dirty syngas may be transferred into the cooling water to generate heated cooling water, which may be sent back to the cooling tower 58 of FIG. 1. As described above, the cooled dirty syngas from the third heat exchanger 64 may be directed to the syngas cleaning system 22 of FIG. 1.

For example, in certain embodiments, the dirty syngas may enter the third heat exchanger 64 at a temperature of approximately 120° F. and may exit the third heat exchanger 64 at a temperature of approximately 115° F. However, in other embodiments, the dirty syngas may enter the third heat exchanger 64 at a temperature in the range of 50-150° F. More specifically, the dirty syngas may enter the third heat exchanger 64 at a temperature of approximately 105° F., 110° F., 115° F., 120° F., 125° F., 130° F., 135° F., and so forth. In addition, the dirty syngas may exit the third heat exchanger 64 at a temperature in the range of 50-150° F. More specifically, the dirty syngas may exit the third heat exchanger 64 at a temperature of approximately 100° F., 105° F., 110° F., 115° F., 120° F., 125° F., 130° F., and so forth. In other words, only a very small amount of heat may be dissipated into the cooling water from the dirty syngas since a substantial amount of the heat energy in the heated dirty syngas entering the LTGC unit 20 may be transferred into the LLP steam and the heated steam condensate in the first and second heat exchangers 60, 62, respectively.

FIG. 3 is a process flow diagram of an exemplary embodiment of an ASU compressor 38 of FIG. 1, which may generate LLP steam. As illustrated, in certain embodiments, the ASU compressor 38 may include multiple compression sections. In particular, the illustrated ASU compressor 38 includes a first compression section 66 and a second compression section 68 connected by a common shaft 70. For instance, the first compression section 66 may be a low-pressure compression section while the second compression section 68 may be an intermediate-pressure or high-pressure section. Air may be received by the first compression section 66 and compressed within the first compression section 66, such that the pressure and the temperature of the air is increased.

In certain embodiments, the heated compressed air 72 may be directed into an inter-cooler 74, where the heated compressed air 72 may be cooled. In particular, in certain embodiments, boiler feedwater may be used as a cooling medium by the inter-cooler 74. As such, heat from the heated compressed air 72 may be transferred to the boiler feedwater to generate LLP steam, which may be used in various applications throughout the IGCC system 10. The cooled compressed air 76 from the inter-cooler 74 may be directed into the second compression stage 68 and compressed within the second compression section 68, such that the pressure and the temperature of the cooled compressed air 76 is increased.

In certain embodiments, the heated compressed air 78 from the second compression section 68 may be directed into an after-cooler 80, where the heated compressed air 78 may be cooled. In particular, in certain embodiments, boiler feedwater may again be used as a cooling medium by the after-cooler 80. As such, heat from the heated compressed air 78 may be transferred to the boiler feedwater to raise the temperature of water or to generate LLP steam, which may also be used in various applications throughout the IGCC system 10. The cooled compressed air from the after-cooler 80 may be directed into the ASU 36 of FIG. 1.

Although illustrated in FIG. 3 as having two compression sections 66, 68, one inter-cooler 74, and one after-cooler 80, in certain embodiments, more than two compression sections, more than one inter-cooler, and/or more than one after-cooler may be used in the ASU compressor 38. In addition, although illustrated as integrating heat exchangers which directly heat boiler feedwater or convert boiler feedwater into LLP steam, in certain embodiments, multi-step processes (e.g., an inter-cooler 74 or after-cooler 80 plus an additional heat exchanger) for converting the low-grade heat energy from the inter-cooler 74 and the after-cooler 80 may be utilized. In addition, in other embodiments, the boiler feedwater may be heated to the saturation temperature within the inter-coolers 74 and the after-coolers 80 and the heated boiler feedwater may then be used in the first heat exchanger 60 of the LTGC unit 20 to generate the LLP steam.

Figure 4:
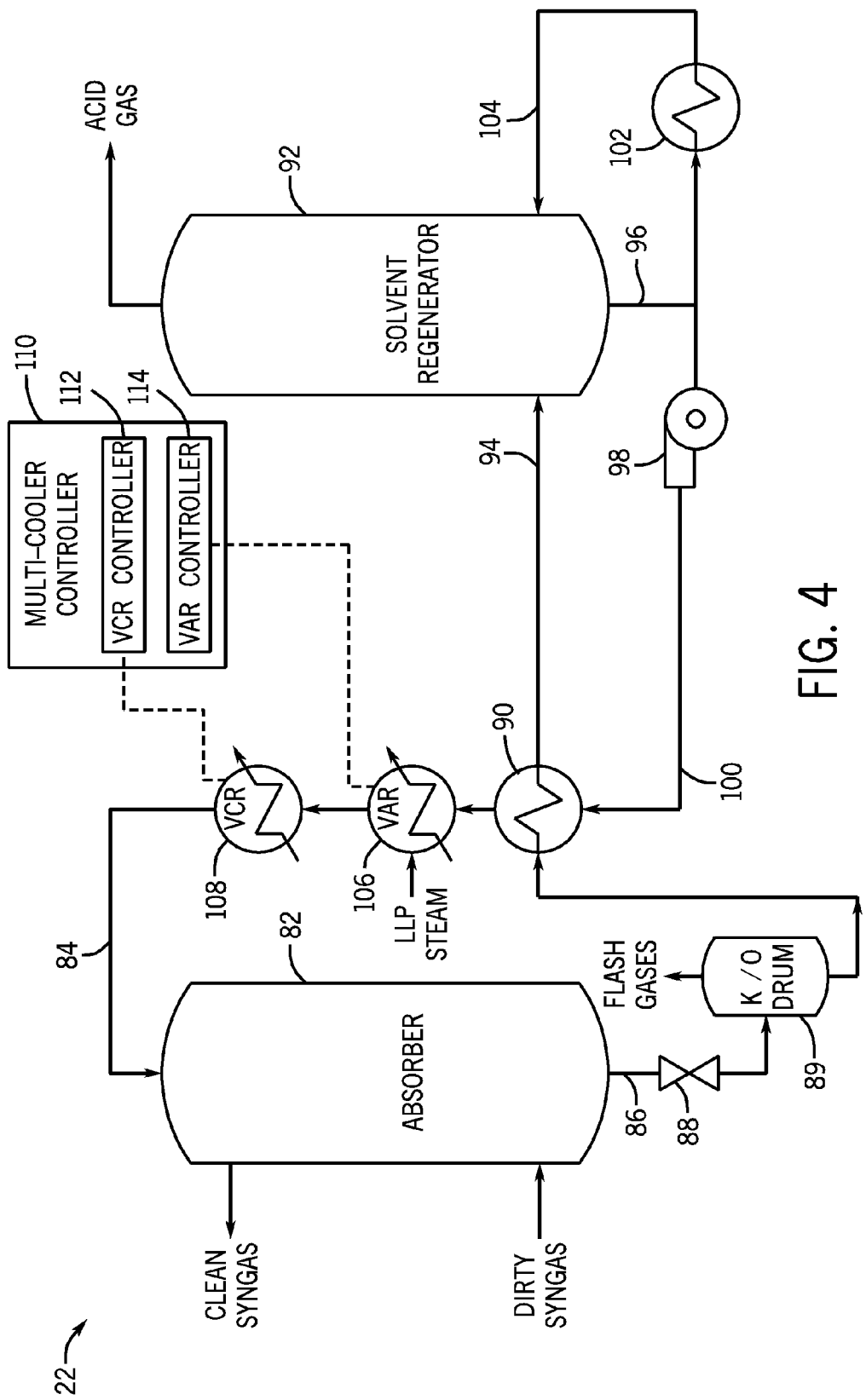
FIG. 4 is a process flow diagram of an exemplary embodiment of a syngas cleaning system of FIG. 1, which has been configured to utilize the LLP steam.

As described above, the LLP steam generated by one of the IGCC heat exchangers (e.g., within the LTGC unit 20 of FIG. 1, the ASU compressor 38 inter-coolers or after-coolers of FIG. 3, and so forth) may be used in various applications throughout the IGCC system 10. FIGS. 4 through 7 illustrate four exemplary methods for utilizing the LLP steam. For example, FIG. 4 is a process flow diagram of an exemplary embodiment of the syngas cleaning system 22 of FIG. 1, which has been configured to utilize the LLP steam as a source of heat energy. In particular, FIG. 4 illustrates an acid gas recovery (AGR) process, which may be part of the syngas cleaning system 22 processes. As illustrated, dirty syngas from the LTGC unit 20 of FIG. 1 may enter an absorber 82 and clean syngas may exit the absorber 82 and be directed to the combustor 32 of the gas turbine engine 34 of FIG. 1 after syngas conditioning and heating as per the gas turbine engine 34 requirements.

More specifically, the absorber 82 may use a solvent to purify (e.g., remove acid gas from) the dirty gas stream. In certain embodiments, the solvent may be introduced through the top of the absorber 82, as illustrated by line 84. As the solvent moves downward through the absorber, the solvent may selectively absorb acid gas vapor from the dirty syngas, such that clean syngas exits near the upper portion of the absorber 82. As such, a mixture of the solvent and acid gas may exit through the bottom of the absorber 82, as illustrated by line 86. The solvent/acid gas mixture may be directed through a control valve 88, a knockout drum (K/O drum) 89, and a heat exchanger 90 before entering a solvent regenerator 92, as illustrated by line 94. The control valve 88 and the K/O drum 89 may be used to control the flow of the solvent/acid gas mixture and to reduce the pressure of the solvent/acid gas mixture to release undissolved gases. In addition, as described below, the heat exchanger 90 may be configured to transfer heat from a separate stream of solvent from the solvent regenerator 92.

Since the acid gas is lighter than the solvent, the acid gas generally exits through the top of the solvent regenerator 92 whereas the solvent exits through the bottom of the solvent regenerator 92, as illustrated by line 96. As illustrated, a first portion of the solvent from the solvent regenerator 92 may be pumped by a pump 98 into the heat exchanger 90, as illustrated by line 100. However, a second portion of the solvent from the solvent regenerator 92 may be circulated through a re-boiler 102 and directed back into the solvent regenerator 92, as illustrated by line 104. As such, the solvent exiting through the bottom of the solvent regenerator 92 may be at a higher temperature than the solvent/acid gas mixture that enters the solvent regenerator 92. However, the solvent may generally absorb the acid gas vapor within the absorber 82 more effectively when the solvent is at lower temperatures. This is part of the rationale behind using the heat exchanger 90 to transfer heat from the solvent in line 100 to the solvent/acid gas mixture from the absorber 82.

However, the amount of heat transferred from the solvent in line 100 to the solvent/acid gas mixture from the absorber 82 in the heat exchanger may be relatively low. As such, the syngas cleaning system 22 may include a vapor absorption refrigeration (VAR) cycle 106 and a vapor compression refrigeration (VCR) cycle 108 to further cool the solvent before the solvent enters through the top of the absorber 82. Cooling the solvent enhances its ability to remove acid gas in the absorber 82. Although illustrated as being in series with each other, the VAR cycle 106 and the VCR cycle 108 may, in certain embodiments, be used in parallel lines.

In certain embodiments, the VAR cycle 106 may include an absorber containing an absorbent within which a refrigerant may dissolve, a pump for increasing the pressure and temperature of the absorbent/refrigerant mixture, a condenser for cooling the refrigerant while maintaining the higher pressure of the refrigerant, an expansion valve for reducing the pressure and temperature of the refrigerant to create a gaseous/liquid state of the refrigerant, and an evaporator for cooling the solvent. The LLP steam may, in certain embodiments, drive the pump of the VAR cycle 106. Conversely, in certain embodiments, the VCR cycle 108 may include a compressor for compressing a refrigerant to create a superheated refrigerant at higher pressures and temperatures, a condenser for cooling the superheated refrigerant while maintaining the higher pressure of the refrigerant, an expansion valve for reducing the pressure and temperature of the refrigerant to create a gaseous/liquid state of the refrigerant, and an evaporator for cooling the solvent.

In certain embodiments, the LLP steam generated by one of the IGCC heat exchangers may be used to drive the VAR cycle 106, which is specifically designed to be driven by heat sources such as the LLP steam. In particular, in certain embodiments, the VAR cycle 106 may be added to an existing AGR process of the syngas cleaning system 22 to supplement an existing VCR cycle 108. As such, the size and power requirements for the VCR cycle 108 may be drastically reduced by adding the VAR cycle 106 and utilizing the LLP steam to drive the VAR cycle 106. In other words, the utility power required to drive the VCR cycle 108 may be offset by instead utilizing the heat energy from the LLP steam to drive the VAR cycle 106 to meet the overall cooling requirements from the combination of the VAR cycle 106 and the VCR cycle 108.

For example, in certain embodiments, approximately 30% of the refrigeration compressor load of the VCR cycle 108 may be decreased using this technique. However, in other embodiments, the refrigeration compressor load of the VCR cycle 108 may be reduced by approximately 10-100%, 10-50%, 20-40%, and so forth. In addition, the VAR cycle 106 generally requires less operating and maintenance costs compared to the VCR cycle 108. As described in greater detail below, in operation, the VCR cycle 108 may enable stable operation during start-up and part-load operations of the IGCC system 10, whereas the VAR cycle 106 may increase the net output and efficiency of the IGCC system 10 during normal operating conditions of the IGCC system 10.

In addition, as described in greater detail below, in certain embodiments, a multi-cooler controller 110 may be used to control the VAR cycle 106 and the VCR cycle 108. In particular, in certain embodiments, the multi-cooler controller 110 may include a VCR controller 112 and a VAR controller 114, wherein the VCR controller 112 may generally be configured to control the VCR cycle 108 and the VAR controller 114 may generally be configured to control the VAR cycle 106. However, the multi-cooler controller 110 may be configured to coordinate the operation of the VCR controller 112 and the VAR controller 114 during start-up, part-load operations, and normal operations.

Figure 5:
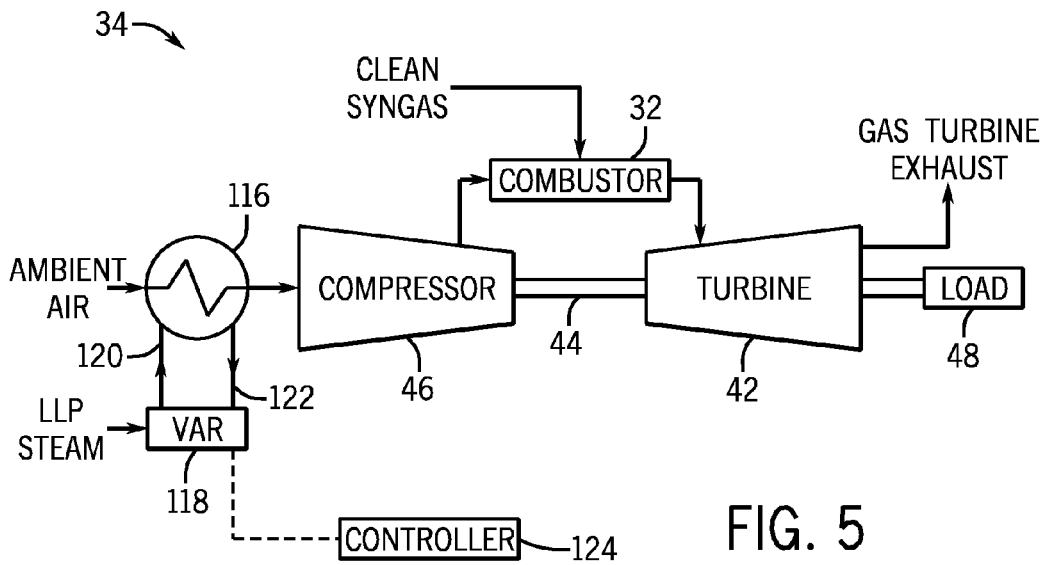
FIG. 5 is a process flow diagram of an exemplary embodiment of the gas turbine engine of FIG. 1, which has been configured to utilize the LLP steam.

The concept of using the LLP steam generated by one of the IGCC heat exchangers (e.g., within the LTGC unit 20 of FIG. 2, the ASU compressor 38 inter-coolers or after-coolers of FIG. 3, and so forth) to drive a VAR cycle may be extended to several other applications throughout the IGCC system 10. For example, FIG. 5 is a process flow diagram of an exemplary embodiment of the gas turbine engine 34 of FIG. 1, which has been configured to utilize the LLP steam as a source of heat energy to drive a VAR cycle. As illustrated, the compressor 46 of the gas turbine engine 34 may intake ambient air, which may be compressed within the compressor 46. However, the gas turbine engine 34 generally operates more efficiently when the air taken into the compressor 46 is cooler and at higher densities.

As such, in certain embodiments, the gas turbine engine 34 may include an inlet air chiller 116, which may be configured to cool the ambient air before directing the cooled air into the compressor 46. Similar to the embodiment illustrated in FIG. 4, the LLP steam generated by one of the components of the IGCC system 10 may be used to drive a VAR cycle 118, which may generate a cooling fluid which may be circulated through the inlet air chiller 116, as illustrated by lines 120 and 122. The cooling fluid from the VAR cycle 118 may be used by the inlet air chiller 116 to cool the ambient air, which is ultimately directed into the compressor 46 for compression.

As will be appreciated, using the inlet air chiller 116 may prove particularly beneficial during hot days, when the efficiency of the gas turbine engine 34 is substantially lower due to the higher ambient air temperatures and lower ambient air densities. As such, using the LLP steam to drive the VAR cycle 118, which enables the inlet air chiller 116 to cool the ambient air, may lead to overall higher efficiencies of the gas turbine engine 34. In certain embodiments, a controller 124 may be used to control the VAR cycle 118, similar to the controllers 110, 112, 114 of FIG. 4.

Figure 6:
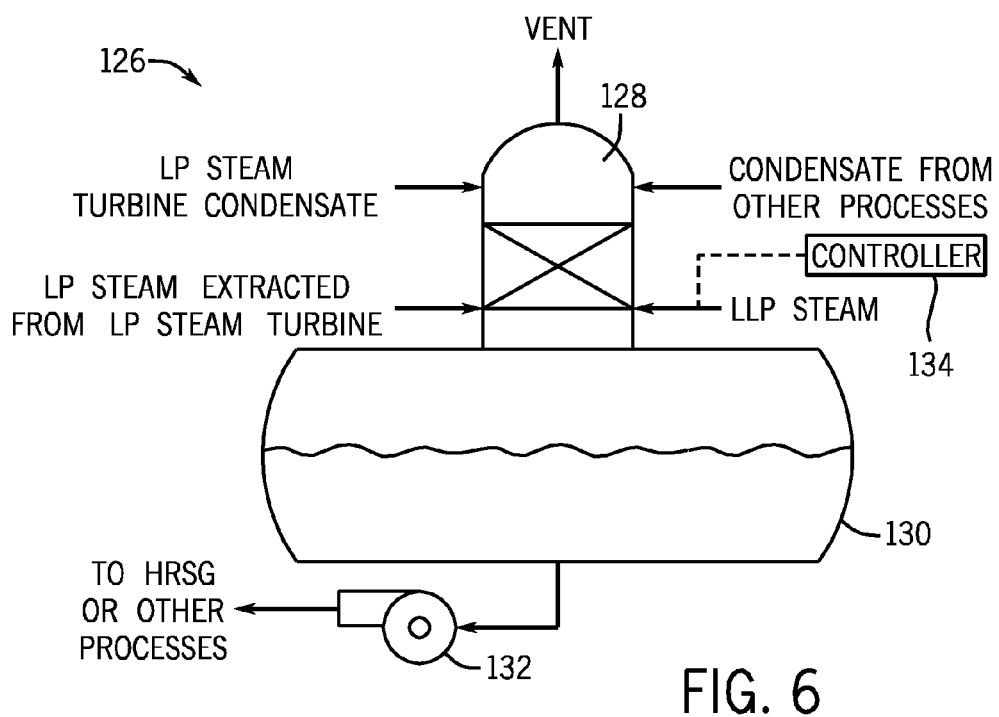
FIG. 6 is a process flow diagram of an exemplary embodiment of a deaerator, which has been configured to utilize the LLP steam.

However, driving VAR cycles is not the only application for the LLP steam generated by one of the IGCC heat exchangers (e.g., within the LTGC unit 20 of FIG. 2, the ASU compressor 38 inter-coolers or after-coolers of FIG. 3, and so forth). For example, FIG. 6 is a process flow diagram of an exemplary embodiment of a deaerator 126, which has been configured to utilize the LLP steam. As illustrated, the deaerator 126 may receive one or more condensate flow streams and one or more steam flow streams. In particular, the deaerator 126 illustrated in FIG. 6 may be configured to receive condensate from a low-pressure (LP) section of the steam turbine 50 of FIG. 1, as well as condensate from other processes throughout the IGCC system 10. In addition, the deaerator 126 illustrated in FIG. 6 may be configured to receive LP steam extracted from the LP section of the steam turbine 50 of FIG. 1, as well as the LLP steam generated by one of the IGCC heat exchangers.

The deaerator 126 illustrated in FIG. 6 is a tray-type deaerator, which consists of a tray section 128 above a boiler feedwater vessel 130. However, other types of deaerators may be used. The condensate streams enter toward the top of the tray section 128 and flow downward through perforated trays toward the boiler feedwater vessel 130. The LP and LLP steam enters toward the bottom of the tray section 128 and flows upward through the perforated trays. The LP and LLP steam strips the condensate of gases dissolved within the condensate and exits through a vent through the top of the tray section 128. Conversely, the deaerated condensate flows into the boiler feedwater vessel 130 as boiler feedwater, where it may be pumped by a pump 132 to the HRSG 52 of FIG. 1 or any other processes throughout the IGCC system 10 that can use boiler feedwater.

The embodiment illustrated in FIG. 6 is similar to the embodiment illustrated in FIG. 4 in that the LLP steam from one of the IGCC heat exchangers is used to supplement existing equipment and/or heat sources. In particular, the LLP steam that is injected into the tray section 128 of the deaerator 126 may offset the amount of LP steam extracted from the LP section of the steam turbine 50 of FIG. 1. As such, the efficiency of the steam turbine 50 and, in turn, the overall efficiency of the IGCC system 10 may be enhanced by utilizing the LLP steam in this manner. In certain embodiments, a controller 134 may be used to control the flow of LLP steam into the tray section 128.

Figure 7:
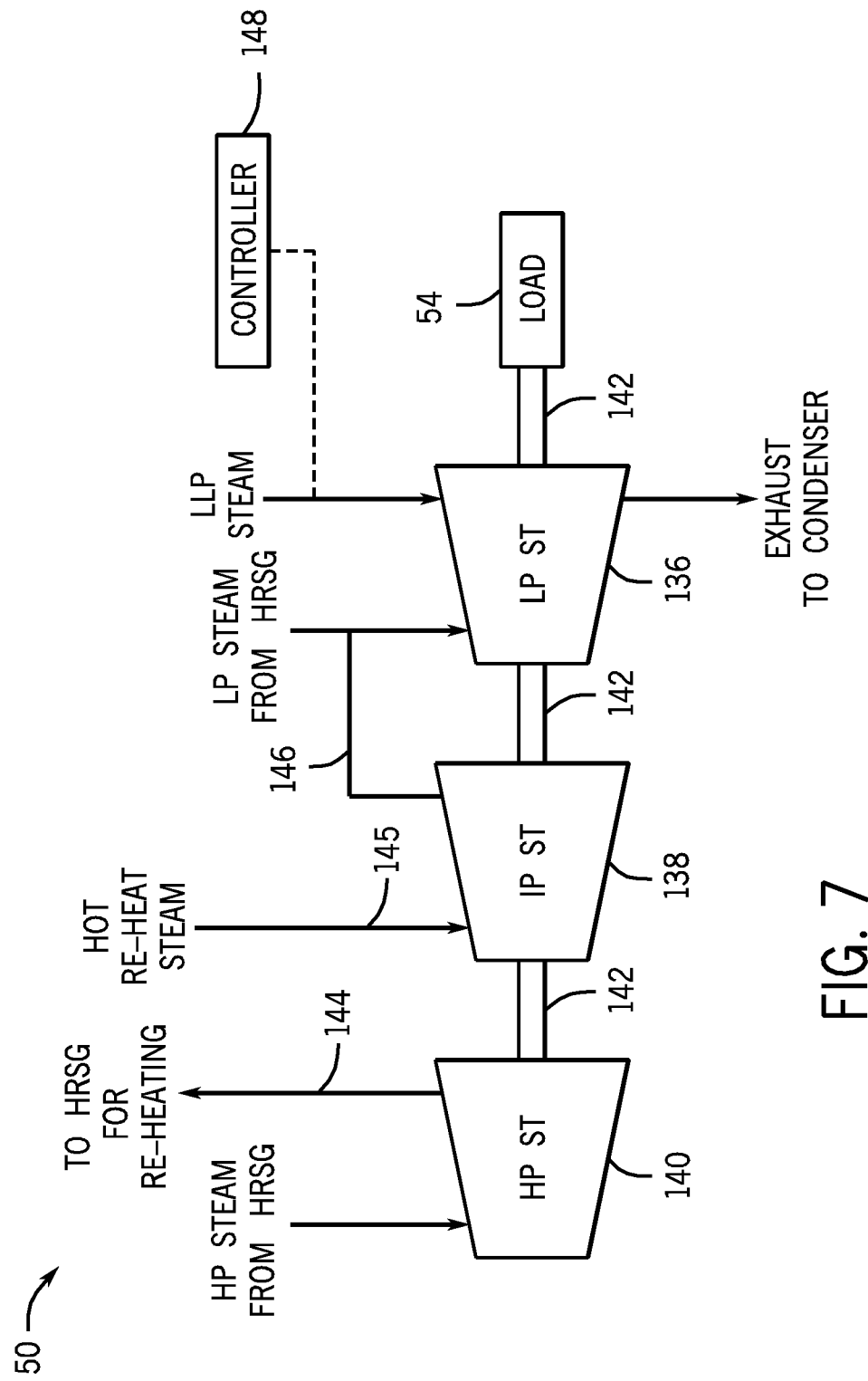
FIG. 7 is a process flow diagram of an exemplary embodiment of the steam turbine of FIG. 1, which has been configured to utilize the LLP steam.

FIG. 7 illustrates another application for the LLP steam generated by one of the IGCC heat exchangers (e.g., within the LTGC unit 20 of FIG. 2, the ASU compressor 38 inter-coolers or after-coolers of FIG. 3, and so forth). In particular, FIG. 7 is a process flow diagram of an exemplary embodiment of the steam turbine 50 of FIG. 1, which has been configured to utilize the LLP steam. In the illustrated embodiment, the steam turbine 50 may include one low-pressure section 136 (LP ST), one intermediate-pressure section 138 (IP ST), and one high-pressure section 140 (HP ST). However, the specific configuration of the steam turbine 50 may be implementation-specific and may include any combination of sections. In certain embodiments, the sections 136, 138, 140 of the steam turbine 50 may drive a common shaft 142, which may drive the load 54 of FIG. 1.

In certain embodiments, high-pressure (HP) steam may be received from the HRSG 52 of FIG. 1 by the high-pressure section 140 of the steam turbine 50. Exhaust from the high-pressure section 140 of the steam turbine 50 may, in turn, be directed into the intermediate-pressure section 138 of the steam turbine 50 after re-heating or without re-heating, as illustrated by lines 144 and 145. In addition, exhaust from the intermediate-pressure section 138 of the steam turbine engine 50 may be directed into the low-pressure section 136 of the steam turbine engine 50, as illustrated by line 146. Furthermore, exhaust from the low-pressure section 136 of the steam turbine 50 may be directed into the condenser 56 of FIG. 1. As illustrated, the LLP steam from one of the IGCC heat exchangers may be admitted into the low-pressure section 136 of the steam turbine engine 50 based on the LLP steam pressure level. For this purpose, the LLP steam may be superheated either in a process section or the HRSG system 52. As such, the output of the low-pressure section 136 and, in turn, the overall efficiency of the steam turbine 50 may be increased. In certain embodiments, a controller 148 may be used to control the flow of LLP steam into the low-pressure section 136 of the steam turbine 50.

Technical effects of the disclosed embodiments include generating LLP steam using various IGCC heat exchangers of the IGCC system 10 (e.g., within the LTGC unit 20 of FIG. 2, the ASU compressor 38 inter-coolers or after-coolers of FIG. 3, and so forth) and utilizing the LLP steam in various application throughout the IGCC system 10 (e.g., driving the VAR cycle 106 of FIG. 4 to supplement the VCR cycle 108 of FIG. 4, driving the VAR cycle 118 of FIG. 5 to cool the ambient inlet air into the gas turbine engine 34 of FIG. 5, supplementing the flow of LP steam extracted from the steam turbine 50 in the deaerator 126 of FIG. 6, improving the output and efficiency of the steam turbine 50 of FIG. 7, and so forth).

The disclosed embodiments lead to several tangible benefits. For example, the disclosed embodiments may lead to a reduction in AGR refrigeration load, leading to improved efficiency and net power output of the IGCC system 10. In addition, the disclosed embodiments may lead to improved performance of the gas turbine engine 34 on hot days by cooling the ambient air before the air is taken into the compressor 46 of the gas turbine engine 34 of the IGCC system 10. The disclosed embodiments may also lead to a reduction in the amount of LP steam extracted from the steam turbine 50 for use in the deaerator 126. The disclosed embodiments may further lead to increased output and performance of the steam turbine 50. In addition to these benefits, the disclosed embodiments may also lead to a reduction in the size of the cooling tower 58, the cooling tower load of the ASU 36 and the AGR section of the syngas cleaning system 22, and so forth. Furthermore, the disclosed embodiments may be implemented in existing IGCC plants as well as new IGCC plants.

In addition, the disclosed embodiments may be at least partially controlled by at least one controller or uniquely programmed device (e.g., a computer), such as the multi-cooler controller 110, VAR controller 112, and VCR controller 114 of FIG. 4, and the controllers 124, 134, and 148 of FIGS. 5, 6, and 7, respectively. In particular, the controllers may be configured to control the operation of the IGCC heat exchangers generating the LLP steam and/or the applications utilizing the LLP steam. The controllers may, in certain embodiments, be physical computing devices uniquely programmed to control valves, pumps, and so forth. More specifically, the controllers may include input/output (I/O) devices for determining how to control the control valves, pumps, and so forth. In addition, in certain embodiments, the controllers may also include storage media for storing historical data, theoretical performance curves, and so forth.

One example of how the controllers may control the operation of the IGCC system 10 to utilize the LLP steam relates to the multi-cooler controller 110 illustrated in FIG. 4. Temperature control logic in the controllers 110, 112, 114, which controls the temperature of the solvent in the syngas cleaning system 22, may be enabled once the gasifier 16 of FIG. 1 is turned on and syngas production has reached at least 50% of the normal operating flow rate. Immediately after start-up of the gasifier 16, the IGCC system 10 may be operating in a part-load condition and, therefore, the control logic may enable one of a plurality of individual units in the VCR cycle 108. Initially, only one compressor in the VCR cycle 108 may be turned on and may be gradually ramped up to its maximum operating point. This may be referred to as a start-up mode.

Once the IGCC system 10 is ramped up to normal operating conditions, the controller may enable the VAR cycle 106. Upon successful start-up of the VAR cycle 106, one of the compressors of the VCR cycle 108 may be shut down. Once the temperature of the solvent decreases for a certain time period, the other compressors of the VCR cycle 108 may be shut down, allowing the refrigeration load to be shared by the VAR cycle 106 and the VCR cycle 108. This may be referred to as the ramp-up mode.

In certain embodiments, the VAR controller 114 may control operation of the VAR cycle 106 and the VCR controller 112 may be configured to control operation of the VCR cycle 108. The VCR cycle 108 may always be operational, irrespective of the load on the IGCC system 10, and the VAR cycle 106 may be shut down through a manual override during turndown. As such, in general, the controllers may comprise a VCR mode, wherein the VCR controller 112 enables the VCR cycle 108 and the VAR controller 114 disables the VAR cycle 106, and a joint mode, wherein the VCR controller 112 enables the VCR cycle 108 and the VAR controller 114 enables the VAR cycle 106.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system, comprising:
   a gas cleaner comprising a solvent to clean a syngas;
   a heat exchanger configured to heat a liquid to generate low, low pressure (LLP) steam having a pressure in a range between approximately 20 psia and approximately 40 psia; and
   a vapor absorption refrigeration (VAR) cycle coupled to the gas cleaner and the heat exchanger, wherein the VAR cycle is configured to cool the solvent, and the LLP steam drives the VAR cycle.

2. The system of claim 1, wherein the gas cleaner comprises an acid gas removal (AGR) system.

3. The system of claim 1, wherein the heat exchanger is coupled to an integrated gasification combined cycle (IGCC) component.

4. The system of claim 1, wherein the heat exchanger is coupled to a compressor.

5. The system of claim 4, wherein the compressor is coupled to an air separation unit (ASU).

6. The system of claim 1, wherein the heat exchanger is coupled to a syngas passage upstream from the gas cleaner.

7. The system of claim 1, wherein the heat exchanger is coupled to a syngas passage between a gasifier and the gas cleaner.

8. The system of claim 1, comprising a cooler coupled to the gas cleaner and a controller coupled to the VAR cycle and the cooler, wherein the cooler is independent from the VAR cycle, and the controller is configured to selectively vary operation of the cooler and the VAR cycle.

9. The system of claim 1, comprising a vapor compression refrigeration (VCR) cycle coupled to the gas cleaner, wherein the VCR cycle and the VAR cycle are configured to cool the solvent.

10. The system of claim 1, wherein the heat exchanger comprises a low-temperature gas cooling (LTGC) section of an integrated gasification combined cycle (IGCC).

* * * * *